United States Patent
Joung et al.

(10) Patent No.: US 7,933,953 B2
(45) Date of Patent: Apr. 26, 2011

(54) DUAL PROCESSING SYSTEM CAPABLE OF ENSURING REAL-TIME PROCESSING IN PROTOCOL CONFORMANCE TEST

(75) Inventors: Jinsoup Joung, Seongnam (KR); Seunghwan Ji, Seongnam (KR); Junwan Park, Seoul (KR); Jahon Koo, Seoul (KR)

(73) Assignee: Innowireless Co., Ltd., Seongnam (KR)

( * ) Notice: Subject to any disclaimer, the term of this patent is extended or adjusted under 35 U.S.C. 154(b) by 384 days.

(21) Appl. No.: 12/133,094

(22) Filed: Jun. 4, 2008

(65) Prior Publication Data

US 2008/0313344 A1 Dec. 18, 2008

(30) Foreign Application Priority Data

Jun. 5, 2007 (KR) .................... 10-2007-0054862

(51) Int. Cl.
*G06F 15/16* (2006.01)
(52) U.S. Cl. .................................. 709/204
(58) Field of Classification Search ............. 709/204
See application file for complete search history.

(56) References Cited

U.S. PATENT DOCUMENTS

| | | | | |
|---|---|---|---|---|
| 5,027,343 A | * | 6/1991 | Chan et al. | 370/250 |
| 5,276,529 A | * | 1/1994 | Williams | 358/406 |
| 5,613,061 A | * | 3/1997 | Taylor | 714/30 |
| 6,069,873 A | * | 5/2000 | Pugaczewski et al. | 370/241 |
| 7,100,092 B2 | * | 8/2006 | Allred et al. | 714/43 |
| 2002/0029331 A1 | * | 3/2002 | Toyoyama et al. | 712/36 |
| 2003/0033406 A1 | * | 2/2003 | John et al. | 709/224 |
| 2003/0093259 A1 | * | 5/2003 | Kolbe | 703/22 |
| 2006/0039538 A1 | * | 2/2006 | Minnis et al. | 379/1.01 |
| 2006/0120283 A1 | * | 6/2006 | Poetker et al. | 370/230 |
| 2007/0127375 A1 | * | 6/2007 | Bae et al. | 370/229 |

* cited by examiner

*Primary Examiner* — John Follansbee
*Assistant Examiner* — Imad Hussain
(74) *Attorney, Agent, or Firm* — Rothwell, Figg, Ernst & Manbeck, P.C.

(57) ABSTRACT

Disclosed herein is a dual processing system capable of ensuring real-time processing in a protocol conformance test. A protocol testing device performs a test on a layer under protocol test provided in a device under test. A communication device processes the protocol of a layer below the layer under protocol test between the device under test and the protocol testing device. The communication device processes a protocol test message, requiring real-time processing, instead of the protocol testing device, and transmits processing results for the protocol test message to the protocol testing device. The protocol testing device processes a protocol test message, not requiring real-time processing, and determines the conformance of the layer under protocol test provided in the device under test based on the processing results for the protocol test message.

9 Claims, 3 Drawing Sheets

US 7,933,953 B2

DUAL PROCESSING SYSTEM CAPABLE OF ENSURING REAL-TIME PROCESSING IN PROTOCOL CONFORMANCE TEST

CROSS REFERENCE TO RELATED APPLICATIONS

This application claims priority from Korean patent application No. 10-2007-0054862 filed on Jun. 5, 2007, all of which is incorporated herein by reference in its entireties for all purposes.

BACKGROUND OF THE INVENTION

1. Field of the Invention

The present invention relates generally to a dual processing system capable of ensuring real-time processing in a protocol conformance test, and, more particularly, to a dual processing system capable of ensuring real-time processing in a protocol conformance test, which processes one or more protocol test messages from a device under test in real time, and then transmits the processed messages to the device under test, thereby increasing the accuracy of a protocol test, and dealing with a communication system, the processing speed of which has been increased.

2. Description of the Related Art

FIG. 1 is a view showing the Open Systems Interconnection (OSI) 7-layer model, which is generally referred to by communication systems.

As shown in FIG. 1, the OSI 7-layer model is an international telecommunications standard protocol in which the process of communication ranging from access to termination is divided into and defined as 7 layers by the International Organization for Standardization (ISO). The lower three layers are related to data transmission over a communication network and the upper four layers are related to the processing of data transmitted over a communication network. Here, the functions of the lower three layers will be described in brief. First, a first layer, that is, a physical layer, defines the configuration, voltage, pin layout and bit transmission method of a communication cable or a connector. In particular, in the case of wireless communication, the physical layer defines a method of modulating frequencies or data. A data link layer, that is, a so-called media access control layer (hereinafter referred to as a 'MAC' layer), defines specifications for a data format used to accurately transmit/receive information bits, that is, data, between computers via the physical layer, and specifications used to detect errors and correct errors in the case of communication errors. Further, a network layer, that is, a so-called IP (Internet Protocol) layer, defines a function of processing data received from the data link layer.

Reference numerals 10 and 20 designate host computers for receiving and processing requests from another computer or providing specific services, and reference numerals 30 and 40 designate routers, which are devices for connecting a Local Area Network (LAN). The routers read the address of a destination from transmission information to be transmitted, designate the most appropriate communication path, and then transmit the transmission information to another communication network.

FIG. 2 is a view showing the structure of data transmitted/received between communication systems using the OSI 7 layers.

As shown in FIG. 2, data transmitted/received between communication systems is generally called a packet in association with the image of a package. Such a packet is differently called a frame, which is handled in a data link layer, a datagram, which is handled in a network layer, and a segment, which is handled in a transport layer. That is, in FIG. 2, each header is a bundle of data in which a communication protocol (hereinafter abbreviated as 'protocol') between peer layers is defined. When data is transmitted from a lower layer to an upper layer, the header of the lower layer is removed. In contrast, when data is transmitted from an upper layer to a lower layer, a corresponding header is attached to a received information field. For example, a frame from which a 'PHY header' part is removed is transmitted from the physical layer to the data link layer. Here, a protocol is a communication protocol for data to be exchanged between communication devices for data communication therebetween. That is, a protocol is rules for methods and sequences necessary to exchange data in order to accurately and desirably transmit and receive data between computers which exchange data.

Therefore, communication systems have been developed and evolved based on such protocols. In order to secure compatibility between protocol-oriented communication systems, various communication standardization organizations and service provider associations request that a certification test for protocol conformance be performed. In particular, in order to perform accurate data transmission/reception between host computers, it is of the utmost importance that a protocol conformance test between data link layers be performed.

FIG. 3 is a block diagram showing a prior art protocol conformance testing system.

As shown in FIG. 3, the structure of the prior art protocol conformance testing system includes a Device Under Test (DUT) 50, in which a layer under protocol test, for example, a data link layer, is realized; a base layer processing device 60 for processing the protocol of a layer below the layer under protocol test (hereinafter referred to as 'base layer'), for example, a physical layer; and a protocol testing host 70 including a protocol test layer processing module 71 for transmitting a request message for a protocol test to the device under test 50 through the base layer processing device 60 and receiving a response message in response to the request message from the device under test 50, and a conformance determination module 73 for determining the conformance of the layer under protocol test realized in the device under test 50 based on the transmitted/received request and response messages. Here, the base layer processing device 60 can be realized using a communication emulator, for example, a Base Station Emulator (BSE) for supporting some of the functions of a base station in a wireless communication environment, in order to provide a communication environment identical to that of a commercialized communication system to a protocol conformance testing system.

Meanwhile, currently used methods capable of accessing the wireless Internet include a method of accessing the Internet over a mobile telecommunication network based on a platform, such as the Wireless Application Protocol (WAP) or the Wireless Internet Platform for Interoperability (WIPI), and a method of accessing the Internet over a public wireless LAN and an access point. However, the method based on the mobile telecommunication network has a fundamental limit as a general Internet access means because of the size of a screen, the limitation of an input interface, and a payment system based on a measured rate system. Further, the wireless LAN has a fundamental problem in that it has low mobility as well as a regional restriction in which the wireless LAN can be used only within a radius of several tens of meters from an access point. In order to overcome the problems, the 'mobile Internet' (the Worldwide Interoperability for Microwave Access (WiMAX) or Wireless Broadband (WiBro), which is the domestic standard of South Korea, as the subset of the WiMAX) has been proposed as a wireless Internet service capable of accessing the Internet at high speed while maintaining quality and cost at the same level as an Asymmetric Digital Subscriber Line (ADSL) during traveling.

As described above, with the increase in the speed of the Internet in a wireless communication environment the protocol conformance testing system has been requested to process response messages, received from the device under test in real time. However, the above-described prior art protocol conformance testing system cannot satisfy the requirement. That is, since a message transmitted/received between a device under test and the host thereof is processed through a communication emulator, the host cannot instantly deal with a message, the rapid processing of which is requested by the device under test from the host. Therefore, with regard to a slow response from the host, the device under test determines that error occurs in an access environment, and transmits an erroneous response message to the host, so that there is a problem in that error occurs in a protocol conformance test.

SUMMARY OF THE INVENTION

Accordingly, the present invention has been made keeping in mind the above problems occurring in the prior art, and an object of the present invention is to provide a dual processing system capable of ensuring real-time processing in a protocol conformance test, in which a protocol test message, requiring real-time processing, is processed by a communication emulator, so that the protocol conformance test is accurately performed in a communication system, the processing speed of which has been increased.

In order to accomplish the above object, the present invention provides a dual processing system capable of ensuring real-time processing in a protocol conformance test, the dual processing system including a protocol testing device for testing a layer under protocol test provided in a device under test; and a communication device for processing the protocol of a layer below the layer under protocol test between the device under test and the protocol testing device; wherein the communication device processes a protocol test message, requiring real-time processing, instead of the protocol testing device, and transmits the processing results for the protocol test message to the protocol testing device; and the protocol testing device processes a protocol test message, not requiring real-time processing, and determines the conformance of the layer under protocol test provided in the device under test based on the processing results for the protocol test message.

The communication device includes a base layer processing module for processing the protocol of the layer below the layer under protocol test; a real-time processing module for exchanging request and response messages for a protocol test, requiring real-time processing, with the device under test; a message transmission/reception module for processing the transmission/reception of protocol test messages between the real-time processing module (or the protocol testing device) and the device under test through the base layer processing module; a message classification module for determining whether the response message of the device under test, input from the message transmission/reception module, requires real-time processing, and transmitting the response message to the real-time processing module if the response message is a real-time message, and transmitting the response message to the protocol testing device if the response message is a non-real-time message; and a communication device-side interface module for interfacing messages to be transmitted/received to/from the protocol testing device.

The protocol testing device includes a non-real-time processing module for exchanging request and response messages for a non-real-time protocol test with the device under test; a conformance determination module for determining conformance of the layer under protocol test, provided in the device under test, based on the results of message processing performed by the non-real-time processing module or the real-time processing module; a protocol test control module for providing a protocol test scenario, including test items, to the real-time processing module or the non-real-time processing module; and a protocol testing device-side interface module for interfacing messages to be transmitted/received to/from the communication device.

Here, the conformance determination module determines the conformance of the layer under protocol test provided in the device under test based on whether a desired predetermined value exists in the response message received by the real-time processing module or the non-real-time processing module.

Further, the layer under protocol test is a data link layer, and the data link layer is a media access control layer to be applied to a portable Internet.

Further, the message classification module determines whether the response message from the device under test requires real-time processing based on a Connection Identifier (CID).

Further, the CID indicates a real-time message when the CID is a basic CID, and the CID indicates a non-real-time message when the CID is not a real-time message.

Further, the communication device-side interface module and the protocol testing device-side interface module transparently transmit messages between the communication device and the protocol testing device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
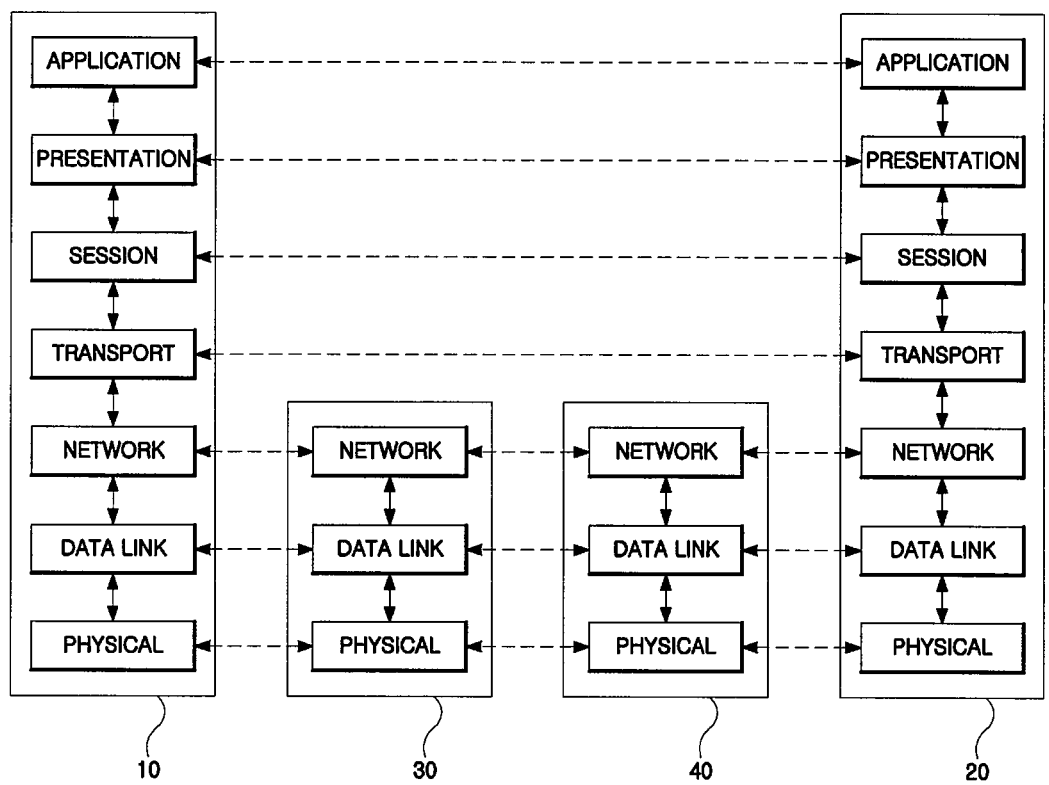
FIG. 1 is a view showing an OSI 7 layer model, which is generally referred to in a communication system.
Figure 2:
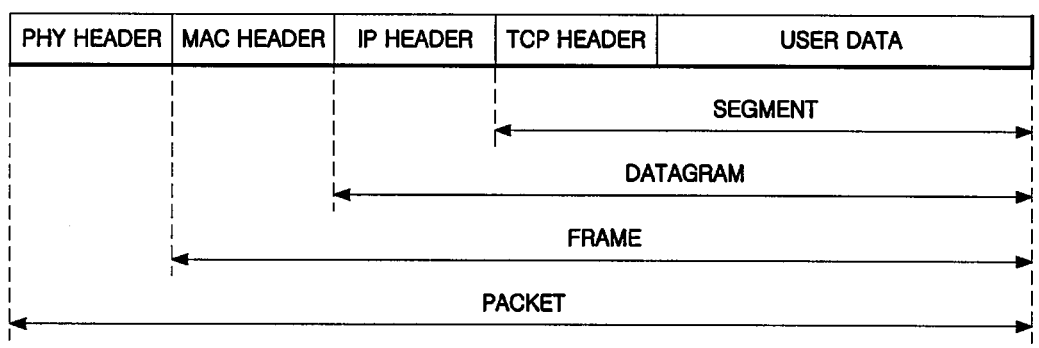
FIG. 2 is a view showing the structure of data transmitted/received between communication systems having the OSI 7 layer.
Figure 3:
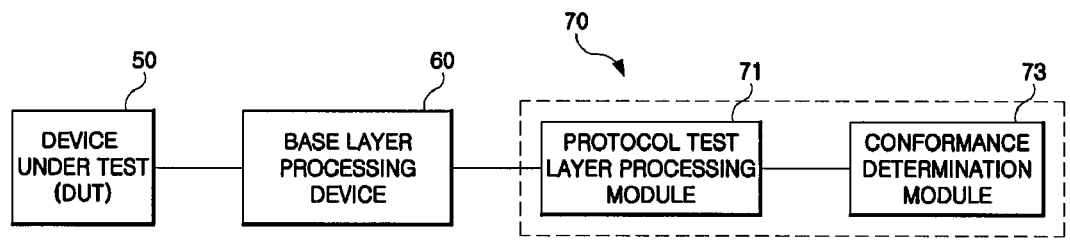
FIG. 3 is a block diagram showing a prior art protocol conformance testing system.

Reference now should be made to the drawings, in which the same reference numerals are used throughout the different drawings to designate the same or similar components.

Hereinafter, a dual processing system capable of ensuring real-time processing in a protocol conformance test according to a preferred embodiment of the present invention will be described in detail with reference to the attached drawings.

Figure 4:
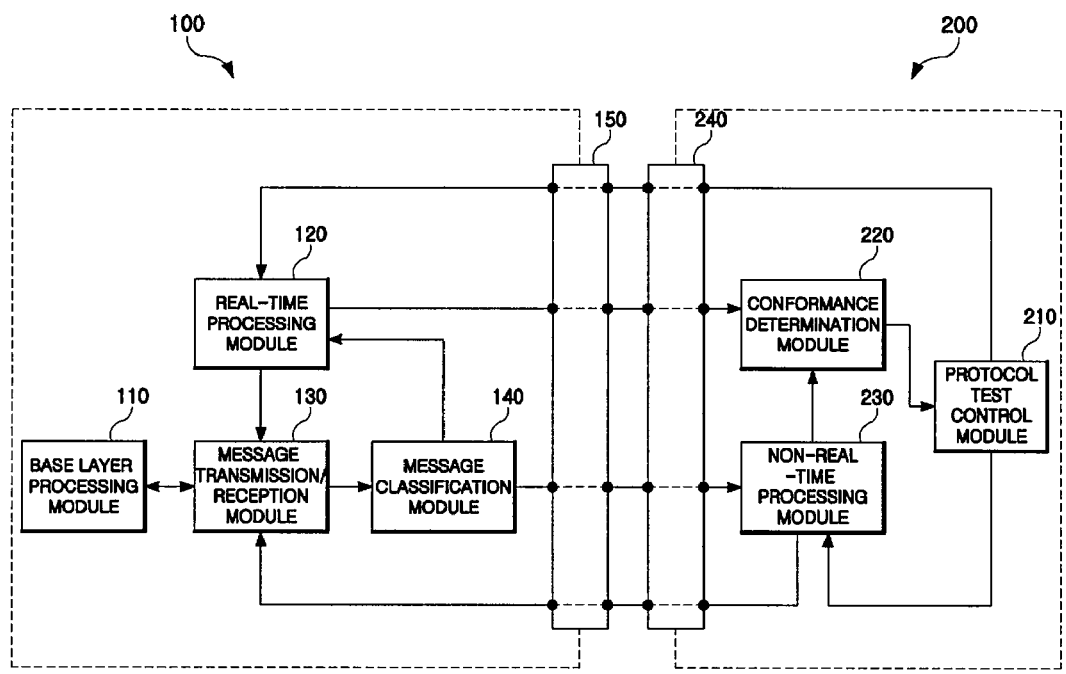
FIG. 4 is a block diagram showing a dual processing system capable of ensuring real-time processing in a protocol conformance test according to an embodiment of the present invention.

FIG. 4 is a block diagram showing the dual processing system capable of ensuring real-time processing in a protocol conformance test according to an embodiment of the present invention.

As shown in FIG. 4, the structure of the dual processing system capable of ensuring real-time processing in a protocol conformance test (hereinafter referred to as a 'protocol conformance testing system') according to the present invention includes a communication device (hereinafter referred to as 'protocol testing emulator') 100 for processing the protocol of a base layer between a device under test and a protocol testing device, which tests a layer under protocol test provided in the device under test, and for processing a protocol test message, requiring real-time processing, instead of a protocol testing device; and the protocol testing device (hereinafter referred to as 'host computer') 200 for entrusting a protocol test message, requiring real-time processing, to the protocol testing emulator 100, receiving a non-real-time message from the protocol testing emulator 100 and processing it, and determining the conformance of the layer under protocol test provided in the device under test, based on the result of the processing of the real-time or non-real-time message.

In the above-described structure, the protocol testing emulator 100 includes a base layer processing module 110; a real-time processing module 120 for exchanging request and response messages for a real-time protocol test, requiring real-time processing, with the device under test; a message transmission/reception module 130 for processing the transmission/reception of the protocol test messages between the real-time processing module 120 (or the host computer 200) and the device under test through the base layer processing module 110; a message classification module 140 for determining whether the response messages of the device under test, input from the message transmission/reception module 130, requires real-time processing, and transmitting the response message to the real-time processing module 120 if the response message is a real-time message, and transmitting the response message to the host computer 200 if the response message is a non-real-time message; and an emulator-side interface module 150 for interfacing messages to be transmitted/received to/from the host computer 200.

Thereafter, the host computer 200 includes a host computer-side interface module 240; a non-real-time processing module 230 for exchanging request and response messages for a non-real-time protocol test with the device under test; a conformance determination module 220 for determining the conformance of the layer under protocol test realized in the device under test based on the results of the message processing performed by the non-real-time processing module 230 or the emulator side real-time processing module 120, that is, based on whether a desired predetermined value exists in the response message received by the device under test due to a request message transmitted to the device under test by the message processing modules 230 and 120; and a protocol test control module 210 for providing a protocol test scenario, including test items, to the real-time processing module 120 or the non-real-time processing module 230, and finally determining the conformance of the layer under protocol test realized in the device under test by collecting a determination result value input from the conformance determination module 220.

For the reason describe above, the protocol conformance testing system according to the present invention performs dual processing on the real-time processing module 120 and the non-real-time processing module 230, so that a real-time message is processed quickly and a non-real-time message is processed slowly. Therefore, according to the present invention, the protocol conformance test can be effectively performed when the protocol of a MAC layer to be applied to the portable Internet (WiMAX or WiBro) is tested.

Further, when the present invention is applied to examine the portable Internet, if a basic Connection Identifier (CID) is included in a response message from the device under test input from the message transmission/reception module 130, the message classification module 140 transmits the response message to the real-time processing module 120. If a CID, other than the basic CID, is included in the response message, the message classification module 140 transmits the response message to the non-real-time processing module 230. Here, the CID is a connection identifier for indicating unidirectional mapping connection between the MAC layers of a base station and a terminal, and designates a value having a length of 16 bits, used to identify a single Upper Link (UL)/Down Link (DL) pair for the single connection of identical entities at the MAC layers of the base station and the terminal. Here, the CID is divided into a basic CID, a primary CID, a transport CID, and a multicast CID. The basic CID requires real-time processing, as described above.

Further, it is preferable that the interface modules 150 and 240 perform a function of transparently transmitting data between the protocol testing emulator 100 and the host computer 200. Here, 'transparent data transmission' means that data is transmitted from a transmission source node to a reception source node without viewing the structure of data handled at a base layer, that is, without modifying a header handled at the base layer.

Figure 5:
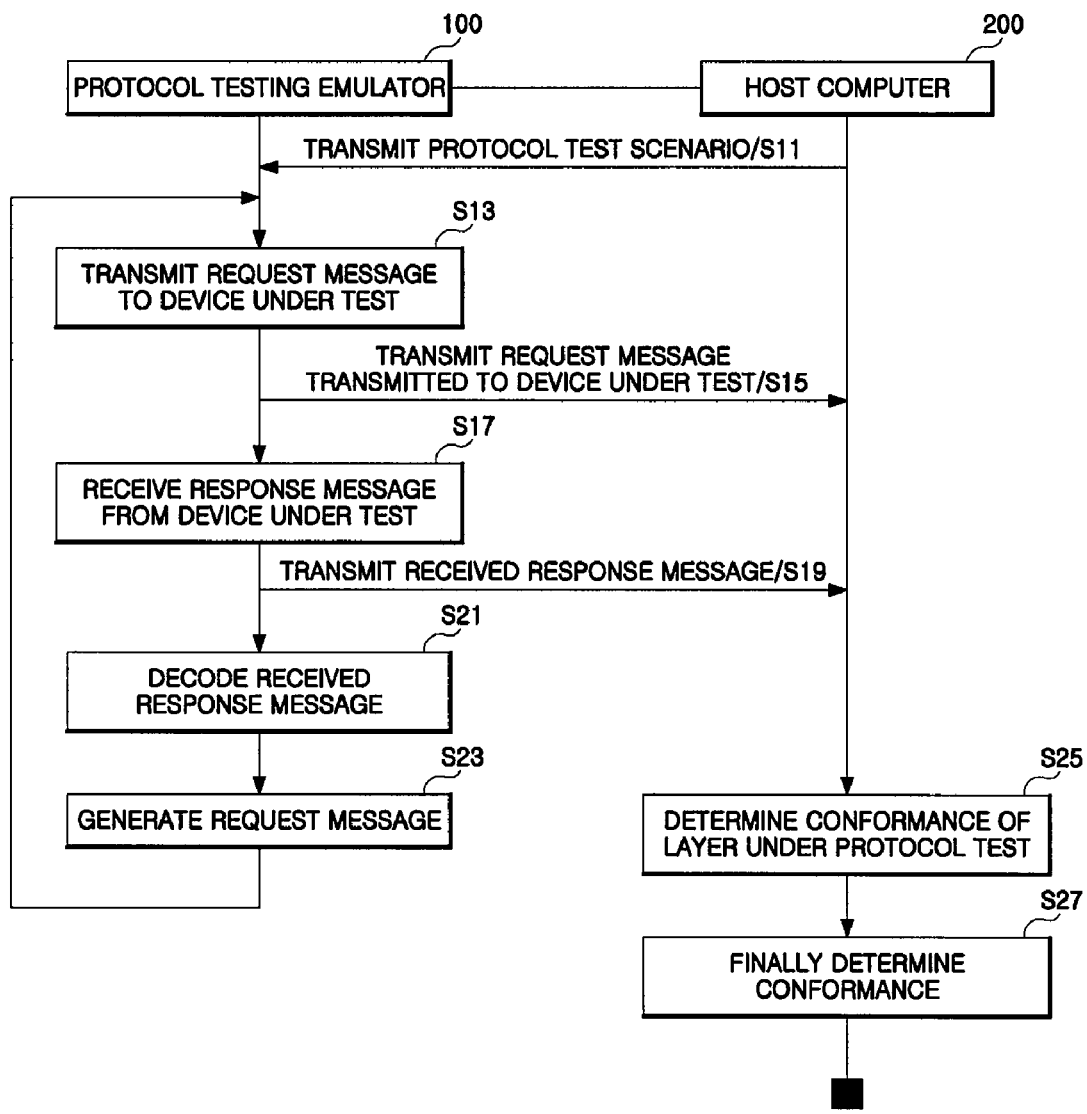
FIG. 5 is a flowchart showing a dual processing method capable of securing real-time processing in a protocol conformance test according to the embodiment of the present invention.

FIG. 5 is a flowchart showing a dual processing method capable of securing real-time processing in a protocol conformance test according to the embodiment of the present invention.

First, at step S11, the protocol test control module 210 transmits a protocol test scenario to the real-time processing module 120. Thereafter, at step S13, the real-time processing module 120 transmits a request message corresponding to a real-time protocol test to the message transmission/reception module 130. The request message is transmitted to the device under test through the message transmission/reception module 130 and the base layer processing module 110. Further, at step S115, the real-time processing module 120 duplicates the request message to be transmitted to the message transmission/reception module 130, and transmits it to the conformance determination module 220.

Therefore, the device under test transmits a response message corresponding to the request message. At step S17, the base layer processing module 110 transmits the received response message to the message classification module 140 through the message transmission/reception module 130. Thereafter, the message classification module 140 determines whether the received response message requires real-time processing. If, as the result of the determination, it is found that the received response message is a real-time message, the message classification module 140 transmits the received response message to the real-time processing module 120.

Thereafter, at step S19, the real-time processing module 120 transmits the response message, input from the message classification module 140, to the conformance determination module 220. At step S21, the received response message is decoded. At step S23, a new request message which satisfies the program test scenario is generated based on the results of the decoding at step S21, and then the process is returned to step S13. Here, at step S19, the message transmission/reception module 130 can perform the operation.

Thereafter, at step S25, the conformance determination module 220 determines the conformance of the layer under protocol test realized in the device under test based on whether a desired specific value exists in the response message received from the device under test due to a request message transmitted to the device under test by the real-time processing module 120.

Thereafter, when the exchange of request and response messages between the real-time processing module 120 and the device under test based on the real-time protocol test scenario is completed, the protocol test control module 210 collects a determination result value input by the conformance determination module 220, and finally determines the conformance of the layer under protocol test realized in the device under test at step S27.

Meanwhile, in the case in which a conformance test can be performed without hindrance even though a response message is processed slowly, the host computer 200 transmits a request message and analyzes a response message. Therefore, the protocol test control module 210 transmits a non-real-time protocol test scenario to the non-real-time processing module 230.

The dual processing system capable of ensuring real-time processing in a protocol conformance test according to the present invention is not limited to the above-described embodiment, and various modifications can be performed, without departing from the technical spirit of the present invention.

In the dual processing system capable of ensuring real-time processing in a protocol conformance test according to the present invention, as described above, a protocol test message, requiring real-time processing, is processed by the communication emulator, so that a protocol conformance test can be accurately realized in a communication system, the processing speed of which has increased.

What is claimed is:

1. A dual processing system capable of ensuring real-time processing in a protocol conformance test, the dual processing system comprising:
    a protocol testing device comprising a processor and memory and configured to test a layer under protocol test provided in a device under test; and
    a communication device comprising a processor and memory configured to process a protocol of a layer below the layer under protocol test between the device under test and the protocol testing device;
    wherein the communication device is configured to process a protocol test message requiring real-time processing instead of the protocol testing device, and transmit real-time processing results for the protocol test message to the protocol testing device; and
    the protocol testing device is configured to process a protocol test message not requiring real-time processing, and determine conformance of the layer under protocol test provided in the device under test based on non-real-time processing results if the protocol test message does not require real-time processing and based on the transmitted real- time processing results if the protocol test message requires real-time processing.

2. The dual processing system as set forth in claim 1, wherein the communication device comprises:
    a base layer processing module configured to process the protocol of the layer below the layer under protocol test;
    a real-time processing module configured to exchange request and response messages for a protocol test, requiring real-time processing, with the device under test;
    a message transmission/reception module configured to process transmission/reception of protocol test messages between the real-time processing module or the protocol testing device and the device under test through the base layer processing module;
    a message classification module configured to determine whether the response message of the device under test, input from the message transmission/reception module, requires real-time processing, and transmit the response message to the real-time processing module if the response message is a real-time message, and transmit the response message to the protocol testing device if the response message is a non-real-time message; and
    a communication device-side interface module configured to interface messages to be transmitted/received to/from the protocol testing device.

3. The dual processing system as set forth in claim 2, wherein the protocol testing device comprises:
    a non-real-time processing module configured to exchange request and response messages for a non-real-time protocol test with the device under test;
    a conformance determination module configured to determine conformance of the layer under protocol test, provided in the device under test, based on results of message processing performed by the non-real-time processing module or the real-time processing module;
    a protocol test control module configured to provide a protocol test scenario, including test items, to the real-time processing module or the non-real-time processing module; and
    a protocol testing device-side interface module configured to interface messages to be transmitted/received to/from the communication device.

4. The dual processing system as set forth in claim 3, wherein the conformance determination module is configured to determine the conformance of the layer under protocol test, provided in the device under test, based on whether a desired predetermined value exists in the response message received by the real-time processing module or the non-real-time processing module.

5. The dual processing system as set forth in claim 4, wherein the layer under protocol test is a data link layer.

6. The dual processing system as set forth in claim 5, wherein the data link layer is a media access control layer to be applied to a portable Internet service.

7. The dual processing system as set forth in claim 6, wherein the message classification module is configured to determine whether the response message from the device under test requires real-time processing based on a Connection Identifier (CID).

8. The dual processing system as set forth in claim 7, wherein the CID indicates a real-time message when the CID is a basic CID, and the CID indicates a non-real-time message when the CID is not a real-time message.

9. The dual processing system as set forth in claim 8, wherein the communication device-side interface module and the protocol testing device-side interface module are configured to transparently transmit messages between the communication device and the protocol testing device.

* * * * *